Patented June 25, 1940

2,205,925

UNITED STATES PATENT OFFICE 2,205,925

FAT SOLUBLE VITAMIN CONCENTRATE

Kenneth C. D. Hickman, Rochester, N. Y., assignor, by mesne assignments, to Distillation Products, Inc., Rochester, N. Y., a corporation of Delaware No Drawing. Application August 24, 1935,
Serial No. 37,751

3 Claims. (Cl. 167—81)

This invention relates to an improvement in vitamin concentrates, and more particularly of the fat soluble vitamins derived from natural sources, such as the animal and vegetable oils and fats.

One of the objects of this invention is to provide a concentrate of fat soluble vitamins A and D, derived from natural sources, such as the marine animal oils, for example, wherein the vitamins that have been concentrated have had substantially no contact with chemical reagents, incidental to the process of concentrating.

A further object of this invention is to provide a concentrate of the fat soluble vitamins, from such sources as the marine and other animal and vegetable oils, and fats, that are substantially free from tastes and odors reminiscent of the source material, said removal of, or reduction in tastes and odor being accomplished by a method involving no chemical treatment of either the source material or the concentrates.

Another object of this invention is to provide a concentrate of fat soluble vitamins, including specifically A, D, and/or E, of a higher degree of purity than has hitherto been available and, in consequence, of greater biologic activity or potency.

It is also an object of this invention to provide concentrates of the fat soluble vitamins, wherein substantially all vitamins are present in the natural form.

A still further object of this invention is to provide a concentrate of the fat soluble vitamins that possess inherent keeping qualities, superior to other known concentrates, because of the fact that the vitamins of the concentrates here comprehended exist largely in the ester form and and therefore, less susceptible to oxidation.

A particular object of this invention is to provide a concentrate of the fat soluble vitamins, from natural sources, particularly from sources where two or more vitamins co-exist, wherein said vitamins are highly concentrated either unassociated with other vitamins or vitamins present, or in various ratios of the several vitamins originally present, and differing substantially from the ratio in which the vitamin originally occurred in the source material.

It is generally believed that naturally occurring vitamins are superior in their biological effect to synthetic vitamins. Biological evidence, experimental and clinical, quite definitely establishes the superior physiological effect of naturally occurring vitamins that have been produced through the metabolic activity of living organisms, as opposed to the synthetic or in vitro, production of chemical structures that display vitamin activity. This is exemplified in the contrast between vitamin D as derived from the marine animal oils to vitamin D derived from the artificial activation of purified ergosterol. It is the consensus of clinical opinion that, rat unit for rat unit, naturally occurring vitamin D is superior clinically for infants, to the vitamin D derived from activated ergosterol. It is also well known that whilst chickens efficiently utilized the vitamin D derived from marine animal oils, benefits may only be derived from irradiated or activated ergosterol in chicks by utilizing doses tremendously in excess of those required when the natural vitamin is employed.

It has also been experimentally established that naurally occurring vitamin A is more readily absorbed from the intestines than the provitamin material carotene, and that other articles of diet do not interfere with the absorption of naturally occurring vitamin A to the same extent as with carotene. It is further the consensus of clinical opinion that when the specific vitamin A physiologic effect is sought that this can be obtained with much smaller doses of the natural vitamin than of carotene.

On the other hand, synthetic vitamins have found wide application, primarily because they can be produced in a pure state, as regards the absence of other vitamins. It is frequently desirable to administer a single vitamin, either in correction of a dietary fault or for definite therapeutic purposes, and it is in such applications that the synthetic vitamins have found wide use. It is also desirable to administer various ratios of associated vitamins, differing widely from those that ocur in natural source materials.

Vitamin concentrates, from natural sources, are known and have been long made in the arts. In the case of fat soluble vitamins A and D, cod-liver oil furnishes, in most cases, the starting material. To obtain fat soluble vitamin concentrates from cod-liver oil, since these vitamins are associated with the unsaponifiable fraction of the oil, it is commn practice to quantitatively saponify the whole oil, and extract the saponified mass with solvents, which dissolve the unsaponifiable material without dissolving appreciable quantities of the soap, formed in the saponification reaction. Separation is then effected between the soaps and the solvent containing the unsaponifiable matter, and lastly the solvent is driven off by suitable means, the vitamins remaining in the residue.

Under these conditions of production, the vitamins occur in the concentrates as the free alcohol, and are exceedingly susceptible to oxidation, with consequent destruction of activity. It also naturally follows that the ratio between the vitamins present, particularly vitamins A and D from the marine animal oils will be found in the concentrate in some ratio fixed by the ratio of their occurrence in the source material, modified to some extent by whatever destruction of the vitamins that may result from the operations incidental to their concentration and extraction.

When it is desirable to obtain a single vitamin by the chemical method of concentration, it becomes necessary to destroy one of the other vitamins, with consequent loss of valuable vitamin material. Diametrically opposed to this method and contrary to what would be expected from a consideration of the prior art, I have found that concentrates may be obtained in which the vitamins may be present over a wide range of ratios, corresponding for example to their ratio as present in the original source material, or they may be present in an entirely different (greater or less) ratio than in the source material. Furthermore, in accordance with my invention, a large quantity of the individual vitamins may be obtained in a high concentrated state free of other vitamins present in the original oil without destruction of the accompanying vitamins as has been the practice heretofore.

In producing the concentrates comprehended by this invention, I employ the method of molecular distillation of the source material, substantially as described in my U. S. Patents, Nos. 1,925,559, and 1,942,858, preferably operating at a pressure below .1 mm. Reference to these patents readily shows that this method of concentration requires no chemical treatment in order to obtain the vitamins free from the major bulk of the source material. The vitamins are concentrated by this method, solely as a result of a difference in boiling points between the vitamins and associated material. The vitamins are not destroyed by this method of distillation due to the fact that a natural volatilization of the vitamins occurs, as the result of the very low absolute pressure employed.

The vitamins thus naturally volatilized are effectively condensed separate from the source material, through the placement of the condensing surface within the mean-free path of the molecule, and this insures the arrival of the volatilized molecules at the condensing surface, without the action of interfering forces, which otherwise would cause a return of a large number of the volatilized molecules to the surface of the source material. The employment of high vacua is essential for two reasons: (a) that the mean-free path of the molecule may be sufficiently extended, so that the condensing surface may be placed far enough away from the surface of the source material, to avoid physical contact between the condensate of volatilized vitamins and the source material; (b) that the volatilization point, or boiling point, of the vitamins may be sufficiently reduced to permit of volatilization of practical quantities of the vitamins without the need of raising the temperature sufficiently to cause thermal destruction thereof.

There is a difference in boiling point between natural vitamins A and D. In fact, neither of the vitamins boils completely at any particular temperature, there being a range of temperatures over which they boil, but there is a distinct difference between the ranges of the two vitamins. It is also possible, by proper adjustment between temperature and rate of flow of source material through the still, to obtain concentrations of mixtures of the co-existing vitamins in various ratios, as may be desired. On the other hand, fish oils which frequently contain large excesses of vitamin A, over vitamin D may be employed to produce concentrates in which vitamin D predominates, or may also be employed to produce highly potent concentrates of vitamin A or vitamin D as separate concentrates.

If a concentrate obtained by molecular distillation, and fairly rich in vitamin A for example, is redistilled in an apparatus so designed that the interdependent relations between temperature, pressure and percentage distillate can be recorded, it is found that vitamin A, as estimated by its ultra-violet absorption, appears in two portions, a small volume distilling over at about 100° C. and a larger (20 times) volume coming over at approximately 160° C. If now an equal quantity of the original concentrate is completely saponified and the small bulk of highly potent material resulting is added to a further equal portion of the original concentrate, and this composition distilled, it will be found that the portion of vitamin A coming over at 100° has been increased by exactly the amount of the total vitamin added as saponified material, whereas the quantity distilling at 160° remains unchanged.

It is evident from the foregoing example that the fraction distilling at about 100° C. is composed of the vitamin in the form of free alcohol, whilst that distilling at a higher temperature is composed of esterified vitamin. It is not definitely known whether the very small amount of vitamin in the free alcohol form thus obtained, results from its presence in this condition in the source material or from unavoidable pyrolysis of the vitamin as a result of the distillation. However, the vitamin in this condition can be readily re-esterified through the action of the chloride of a suitable fatty acid, such as palmitic, yielding the palmityl ester of the vitamin. When it is desirable for all of the vitamin concentrate to be utilized in the ester form, this small fraction, obtained as the free alcohol, can be converted to the ester and added to the main ester fraction derived from the distillation.

Concentrates having a particular desired potency may be produced by merely varying the amount of oil distilled with the vitamin. Thus distillates have been produced which have approximately the same potency as the vitamins themselves. If it is desired to further concentrate a more or less potent distillate the sterols present may be removed by expedients such as precipitation by freezing, the vitamin alcohols freed by saponification and separated by solvent extraction with solvents such as ether, chloroform, etc., and the thus purified alcohol re-esterified to form the natural vitamin ester. The esterification can be carried out in the manner set forth in the following example.

25 grams of a saponified vitamin A concentrate having a potency of 2,480,000 U. S. P. X. units is dissolved in 50 cc. of pyridine and 50 cc. of benzol, both being anhydrous. To this 10 grams of palmityl chloride is added and the mixture heated on a water bath for 3 hours. The reaction mixture is then taken up in water and the pyridine removed with dilute acid, such as hydrochloric or acetic, and the benzol removed in a vacuum. The palmitic acid ester of vitamin A remains as the residue together with a small amount of unesterified material. A practically theoretical esterification takes place. Obviously, any other acid may be used such as the acid halides of acetic, oleic, linoleic, stearic acids, etc., and also any other inert solvent such as toluene, benzine, xylene, etc. Pyridine need not be used although it is advantageous to employ it. Instead of operating in the above manner direct condensation such as with the acid anhydrides may be employed.

When an oil or fat of a high degree of purity is employed, and through proper utilization of pretreatment of this oil by physical means, such, for example, as exposure of this oil to relatively high vacuum and at relatively low temperature before the oil passes into the still proper, it becomes possible to obtain vitamin concentrates substantially free from fatty acids.

In oils of relatively low purity, that is, containing a relatively high percentage of free fatty acids, under some conditions it is possible to withdraw the major portion of the free fatty acids present in the original oil before the vitamins distill. However, with this type of source material it sometimes occurs, when the still is being operated primarily with the view of economy of operation, to obtain the vitamin concentrates containing relatively large quantities of free fatty acids. The presence of free fatty acids in the vitamin concentrates is undesirable. When a concentrate is obtained containing free fatty acids, the percentage of free fatty acids present may be determined in a small portion of the concentrate, and in this way the quantitative amount of alkali required to saponify the free fatty acids can be determined. The bulk of the concentrate can then be treated with the quantitative amount of alkali required to saponify the free fatty acids, and while this constitutes chemical treatment of the concentrate, it must be pointed out that due to the high chemical activity of the free fatty acids, the reaction takes place selectively between the free fatty acids and the added alkali, without subjecting associated structures to chemical action, as a result of the presence of the alkali. It is obvious that the quantitative removal of the free fatty acids by direct neutralization may be practiced on the original source material with the same overall results as on the concentrates. When the amount of alkali added is just sufficient to neutralize the free fatty acids, no chemical influence is exerted upon the associated substance. Should it be desirable to completely eliminate contact of the vitamins with alkali, accompanying free fatty acids may be removed by the use of solvents selective to the free fatty acids, without dissolving the vitamins or vitamin esters, for example, by extraction with furfural or its derivatives, as disclosed in the copending application of A. O. Tischer, Serial No. 30,765, filed July 10, 1935.

In the process by which the concentrates of this invention are produced, the physical pretreatment of the oil, in what is termed the degasser in my Patent No. 1,942,858, serves to remove substantially all of the objectionable odor and taste present in the source material by physical means and thus separates it from the vitamin fractions later obtained during the process of molecular distillation. This is of great importance in producing concentrates for the addition to food products, since the concentrates thus produced can in nowise interfere with the normal flavor and odor of the food products receiving the vitamin addition. On the other hand, under certain conditions of operation: i. e., one stage distillation, concentrates of exceedingly high potency may be obtained that are quite as mal-odourous as the original oil. But because of the extremely high potency of these concentrates odour does not become a factor since, on the addition of them to foods, the dilution factor becomes so great that no unnatural odour or taste is imparted to the finished product. However, in cases of foods with exceedingly delicate flavour, such mal-odourous concentrates can be largely deodourized by a subsequent multistage distilling operation or, in many cases, simply subjecting the concentrates to high vacuum, without redistillation.

The process described can obviously be used to concentrate fat soluble vitamins contained in naturally occurring oils generally. Among those which may be treated according to the process described are menhaden, shark, swordfish, salmon, sardine, dogfish, burbot fish oils, halibut, cod and salmon liver oils, cottonseed, wheat germ and corn oils.

There is some clinical evidence in support of the view that the fat soluble vitamins are perhaps better used physiologically when administered in the presence of a small amount of the fat or oil in which the vitamins originally occur. Vitamin concentrates produced by the chemical method of saponification are extracted substantially free from the oleaginous portion of the original source material, and it becomes necessary, if these vitamins are to be associated with any amount of the natural occurring oleaginous material to supply this through addition of the whole oil or fat, and this becomes objectionable when the whole oil or fat is derived from marine animals or fish, since these oils and fats are highly odoriferous and impart to the vitamin concentrate objectionable odors and taste. It is also desirable to preserve the concentrated vitamins in an oily medium, since this offers a degree of protection to the vitamins against rapid oxidation. It is thought that with the concentrates of this invention it is not necessary to have accompanying fat from any source, insofar as biologic effect is concerned, since the vitamins exist in their concentrated but natural form and are, therefore, more readily assimilated. On the other hand, should it be desirable to have some of the fat of the source material accompany the vitamins it is possible to adjust the distilling conditions so that a small amount of the source material distills at the same time as the vitamins, and thus a portion of the original fat can be made to accompany the vitamins, without the introduction of separate and, therefore, mal-odourous, portions of the whole oil or fat. In the chemical concentration of vitamins it is the practice to add to the vitamins so-called neutral oils, for the purpose of preservation, and thus the vitamins are removed entirely from their natural environment, whereas the concentrates of this invention are natural vitamins, existing in their natural environment, when such is desired.

I have definitely established that vitamin A occurs in the natural oils in the form of an ester. The acyl portion of the molecule is derived from the higher fatty acids. It may be said in summary that my invention resides in the provision of highly potent vitamin concentrates as new compositions of matter in which the condition of the vitamins corresponds to the condition of the naturally occurring vitamins, but separated from the undesirable bodies and impurities present in the source material. As previously indicated, vitamin concentrates have never before been produced in which the vitamin is present in the same condition in which it existed in the source material. The vitamins present in concentrates produced by chemical means, such as saponification, are not only in the form of alcohols, but molecule for molecule are less readily assimilated by the animal body than the esters and may thus be considered to be of a lower degree of potency as a result of the chemical treatment.

The vitamins present in the concentrates herein described are not alcohols, but esters, and in this condition possess far better keeping qualities than the vitamin concentrates of commerce in alcohol form, due to their resistance to oxidation. Furthermore, in producing those concentrates in which the various vitamins are present in adjustable ratios, yet in a condition corresponding to their condition in the source material, an additional hitherto entirely unattainable result has been attained.

I claim:

1. As a new composition of matter, a concentrate of vitamin A which is obtainable from naturally occurring animal oils and fats and which contain the vitamin A substantially entirely in ester form and in the same chemical state in which it occurs in the natural oils, said concentrate having a vitamin concentration much higher than that of the raw oil and being substantially free of other constituents of the oil which are separatable by subjecting the raw oil to high vacuum distillation at a pressure below .1 mm.

2. As a new therapeutic preparation, concentrated vitamin A which is obtainable from naturally occurring animal oils and fats and which contains the vitamin A substantially entirely in the form of esters of high molecular weight fatty acids and in the same chemical state in which it occurs in the natural oils, said concentrated vitamin A having a vitamin concentration much higher than that of the raw oil and being substantially free of other constituents of the oil which are separatable by subjecting the raw oil to high vacuum distillation at a pressure below .1 mm.

3. As a new composition of matter, a concentrate of vitamins A and D which contains the vitamin A substantially entirely in ester form and in the same chemical state in which it occurs in natural animal oils and fats, the vitamins A and D being present in the concentrate in a ratio different than, and not fixed by, the ratio in which they exist in the natural animal oils, said concentrate having a vitamin concentration much higher than that of the raw oil and being substantially free of other constituents of the oil which are separatable by subjecting the raw oil to high vacuum distillation at a pressure below .1 mm.

KENNETH C. D. HICKMAN.